US009683459B2

United States Patent
Aoki et al.

(10) Patent No.: US 9,683,459 B2
(45) Date of Patent: Jun. 20, 2017

(54) SECURING PART STRUCTURE OF TURBINE NOZZLE AND TURBINE USING SAME

(71) Applicant: IHI Corporation, Tokyo (JP)

(72) Inventors: Hiroyuki Aoki, Tokyo (JP); Atsushi Tsuru, Tokyo (JP); Torataro Takemika, Tokyo (JP)

(73) Assignee: IHI Corporation, Tokyo (JP)

( * ) Notice: Subject to any disclaimer, the term of this patent is extended or adjusted under 35 U.S.C. 154(b) by 239 days.

(21) Appl. No.: 14/691,056

(22) Filed: Apr. 20, 2015

(65) Prior Publication Data

US 2015/0226075 A1 Aug. 13, 2015

Related U.S. Application Data

(63) Continuation of application No. PCT/JP2013/078584, filed on Oct. 22, 2013.

(30) Foreign Application Priority Data

Oct. 29, 2012 (JP) .................................. 2012-237871

(51) Int. Cl.
*F01D 25/24* (2006.01)
*F01D 9/04* (2006.01)

(52) U.S. Cl.
CPC ............. *F01D 25/246* (2013.01); *F01D 9/04* (2013.01); *F01D 25/24* (2013.01); *Y02T 50/671* (2013.01)

(58) Field of Classification Search
CPC ... F01D 9/04; F01D 9/00; F01D 9/042; F01D 25/24; F01D 25/28; F01D 25/246
(Continued)

(56) References Cited

U.S. PATENT DOCUMENTS 4,687,413 A * 8/1987 Prario .................... F01D 11/08
403/319
8,425,184 B2 4/2013 Druez et al.
(Continued)

FOREIGN PATENT DOCUMENTS

CN 1780972 A 5/2006
DE 102009003638 A1 10/2009
(Continued)

OTHER PUBLICATIONS

Extended European Search Report, European Patent Application No. 13850629.0, Aug. 30, 2016, 6 pgs.
(Continued)

*Primary Examiner* — Richard Edgar
(74) *Attorney, Agent, or Firm* — Volpe and Koenig, P.C.

(57) ABSTRACT

A securing part structure of a turbine nozzle provided with a plurality of turbine nozzle segments, each having a plurality of stator vanes, arranged annularly around an axis of a jet engine and secured between a turbine case and a shroud of the jet engine, wherein in the turbine nozzle segment, an arc-shaped outer band coupling distal ends of the plurality of stator vanes to each other is provided, a hook of the outer band is engaged with a nozzle support groove of the turbine case from behind, a recessed portion of the outer band is fitted with an anti-rotation tab from behind, and an anti-rotation slot formed in the shroud is fitted with a protruding portion from behind so that the turbine nozzle segment is secured between the turbine case and the shroud. Reduction of performance loss and extension of a life of the turbine case can be realized.

2 Claims, 4 Drawing Sheets

(58) Field of Classification Search
USPC ................................ 415/173.1, 209.3, 209.2
See application file for complete search history.

(56) References Cited

U.S. PATENT DOCUMENTS

| | | |
|---|---|---|
| 2009/0246012 A1 | 10/2009 | Shapiro et al. |
| 2010/0247298 A1 | 9/2010 | Nakamura et al. |
| 2010/0284811 A1 | 11/2010 | Druez et al. |

FOREIGN PATENT DOCUMENTS

| | | |
|---|---|---|
| FR | 2941488 A1 | 7/2010 |
| JP | 63-32105 A | 2/1988 |
| JP | 4269763 B2 | 5/2009 |
| WO | 2004/097183 A1 | 11/2004 |
| WO | 2005/003520 A1 | 1/2005 |
| WO | 2012/057971 A1 | 5/2012 |

OTHER PUBLICATIONS

International Search Report, PCT/JP2013/08584, Nov. 19, 2013, 1 pg.

\* cited by examiner

SECURING PART STRUCTURE OF TURBINE NOZZLE AND TURBINE USING SAME

TECHNICAL FIELD

The present invention relates to a securing part structure of a turbine nozzle used for securing a turbine nozzle constituting an aircraft jet engine, for example, between a turbine case and a shroud and a turbine using the same.

BACKGROUND ART

A turbine nozzle constituting a jet engine constituted as above is arranged alternately with turbine disks in a plurality of stages in a turbine case. For this turbine nozzle, a structure divided into a plurality of turbine nozzle segments is usually employed in order to improve high-temperature strength or the like, and these turbine nozzle segments are provided with a plurality of stator vanes and are arranged annularly around an axis of the jet engine.

This turbine nozzle segment includes an arc-shaped inner band coupling each of proximal ends (end portions on the axis side of the let engine) of the plurality of stator vanes to each other and an arc-shaped outer band coupling each of distal ends (end portions on the side opposite to the axis of the jet engine) of the plurality of stator vanes to each other.

On the arc-shaped outer band of the turbine nozzle segment, an engagement portion to be engaged with a receiving portion formed on the turbine case and an anti-rotation slot to be engaged with a rotation stopper fixed to the turbine case are formed, and this turbine nozzle segment engages the engagement portion of the outer band with the receiving portion of the turbine case from behind the jet engine and also engages the anti-rotation slot of the outer band with the rotation stopper and then, a periphery of the anti-rotation slot of the outer band is pressed by a peripheral portion of the shroud, whereby the turbine nozzle segment is fixed between the turbine case and the shroud.

Such securing part structure of the turbine nozzle is described in Patent Literature 0.1, for example.

PRIOR ART DOCUMENT

Patent Document

Patent Document 1: Japanese Patent No. 4269763

SUMMARY OF THE INVENTION

Problems to be Solved by the Invention

In the above-described securing part structure of the turbine nozzle, most of a high-temperature gas from a combustor passes between the inner band and the outer band of the turbine nozzle segment, but since the high-temperature gas having entered through a gap between the stages of the turbine nozzle in plural stages passes through the anti-rotation slot of the outer band of the turbine nozzle segment engaged with, the rotation stopper on the turbine case, performance loss is generated for the portion of the high-temperature gas leaking through this anti-rotation slot, and the turbine case is exposed to the high temperature, which are problems, and a solution of the problems has been in demand.

The present invention has been made in view of the above-described prior-art problems and has an object to provide a securing part structure of a turbine nozzle which can keep an amount of a high-temperature gas leaking from between the rotation stopper on the turbine case and the turbine nozzle segment small and realize reduction of the performance loss and extension of a life of the turbine case and a turbine using the same.

Means for Solving the Problems

In order to achieve the above-described object, the present invention is a securing part structure of a turbine nozzle provided with a plurality of turbine nozzle segments, each having a plurality of stator vanes, arranged annularly around an axis of a jet engine and secured, between a turbine case and a shroud of the jet engine, in which in the turbine nozzle segment, an arc-shaped outer band coupling each of distal ends of the plurality of stator vanes on a side opposite to the axis to each other is provided, on the outer band in the turbine nozzle segment, a hook engaged with a nozzle support groove formed, on the turbine case, a recessed portion fitted with an anti-rotation tab secured to the turbine case, and a protruding portion protruding toward a rear of the jet engine, in conformity to a recess of the recessed portion, on a back side of this recessed portion, are formed, the turbine nozzle segment engages the hook of the outer band with the nozzle support groove of the turbine case from behind the jet engine and also fits the recessed portion of the outer band with the anti-rotation tab from behind the jet engine and fits an anti-rotation slot formed in the shroud with the protruding portion formed on the back side of the recessed portion from behind the jet engine, whereby the turbine nozzle segment is secured between the turbine case and the shroud.

Moreover, the present invention is a turbine and is configured such that the above-described securing part structure of the turbine nozzle is used as a securing part structure of a turbine nozzle constituting a turbine in a jet engine.

In the securing part structure of the turbine nozzle according to the present invention, the hook of the outer band of the turbine nozzle segment is engaged with the nozzle support groove of the turbine case from behind the jet engine, and the recessed portion of the outer band is fitted with the anti-rotation tab from behind the let engine.

Then, by fitting the anti-rotation slot of the shroud with the protruding portion formed on the back side of the recessed portion of the outer band from, behind the jet engine, the turbine nozzle segment is secured between the turbine case and the shroud and thus, an amount of a high-temperature gas leaking from between the anti-rotation tab on the turbine case and the turbine nozzle segment, can be kept small.

Therefore, performance loss for a portion by which the amount of the leaking high-temperature gas can be kept small is reduced, and a life of the turbine case can be extended for a portion by which, the turbine case is not exposed to the high temperature easily.

Moreover, by fitting the anti-rotation slot of the shroud with the protruding portion formed on the back side of the recessed portion of the outer band, rotation of the shroud around the engine axis is also suppressed, that is, the protruding portion formed in conformity to the recess of this recessed portion on the back side of the recessed portion of the outer band also has a rotation stopping function of the shroud and thus, an increase in a weight can be suppressed for a portion by which an anti-rotation tab portion to be fitted with the anti-rotation slot of the shroud does not have to be provided separately.

Furthermore, as described above, since the turbine case is not exposed to a high temperature easily any longer, if an active clearance control system (ACC system) for cooling the turbine case and for keeping it to a proper size is employed, cooling air for cooling the turbine case can be reduced.

In the turbine according to the present invention, by employing the above-described securing part structure of the turbine nozzle, improvement of performance and extension of the life can be realized.

Advantageous Effects of the Invention

With the securing part structure of the turbine nozzle according to the present invention, an extremely excellent effect that reduction of the performance loss and extension of the life of the turbine case can be realized in addition to suppression of an increase in the weight is obtained.

MODE FOR CARRYING OUT THE INVENTION

The present invention will be described below on the basis of the attached drawings.

FIGS. 1A to 4 illustrate an embodiment of a securing part structure of a turbine nozzle according to the present invention, and in this embodiment, a low-pressure turbine constituting a jet engine will foe described as an example.

Figure 1A:
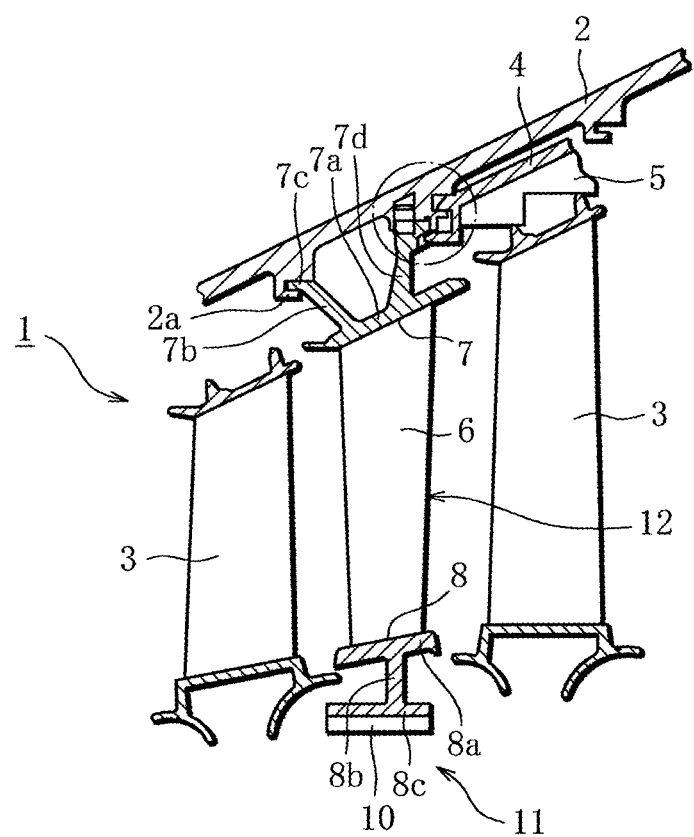
FIG. 1A is a partial sectional explanatory view of a turbine for which a securing part structure of a turbine nozzle according to an embodiment of the present invention is employed.

As illustrated in FIG. 1A, a low-pressure turbine 1 constituting the jet engine includes a turbine case 2. In this turbine case 2, turbine disks in plural stages (not shown) rotating around an engine axis are arranged at an appropriate interval in a direction of the engine axis (right-and-left direction in the illustration), and a plurality of turbine blades 3 are arranged on peripheral portions of these turbine disks, respectively.

The turbine disks in plural stages are coupled so as to be rotated integrally with each other, and these turbine disks are integrally coupled to a compressor rotor of a low-pressure compressor and a fan rotor of a fan, not shown, arranged, on a front part of the jet engine.

Moreover, in the turbine case 2, shrouds 4 in plural stages (only one stage is shown in FIG. 1A) for suppressing a rise in a temperature of this turbine case 2 are arranged so as to surround the corresponding turbine blades 3, respectively, and a honeycomb seal 5 in a state allowed to be in contact with a distal end of the corresponding turbine blade 3 is arranged inside the shroud 4.

A dividing structure is employed for this shroud 4, and a segment of the shroud 4 is mounted on the turbine case 2 by engaging an arc-shaped hook 4a thereof to a shroud support groove 2d formed on the turbine case 2.

Moreover, in the turbine case 2, turbine nozzles 11 in plural stages (only one stage is shown in FIG. 1A) are arranged alternately with the turbine disks in plural stages at an appropriate interval in the engine axial direction, and the dividing structure is employed also for this turbine nozzle 11.

That is, in this low-pressure turbine 1, a driving force is obtained, by rotating the turbine disks in plural stages by expansion of a high-temperature gas from a combustor, not shown, so that the low-pressure compressors and the fan rotors in plural stages are integrally rotated.

Figure 2:
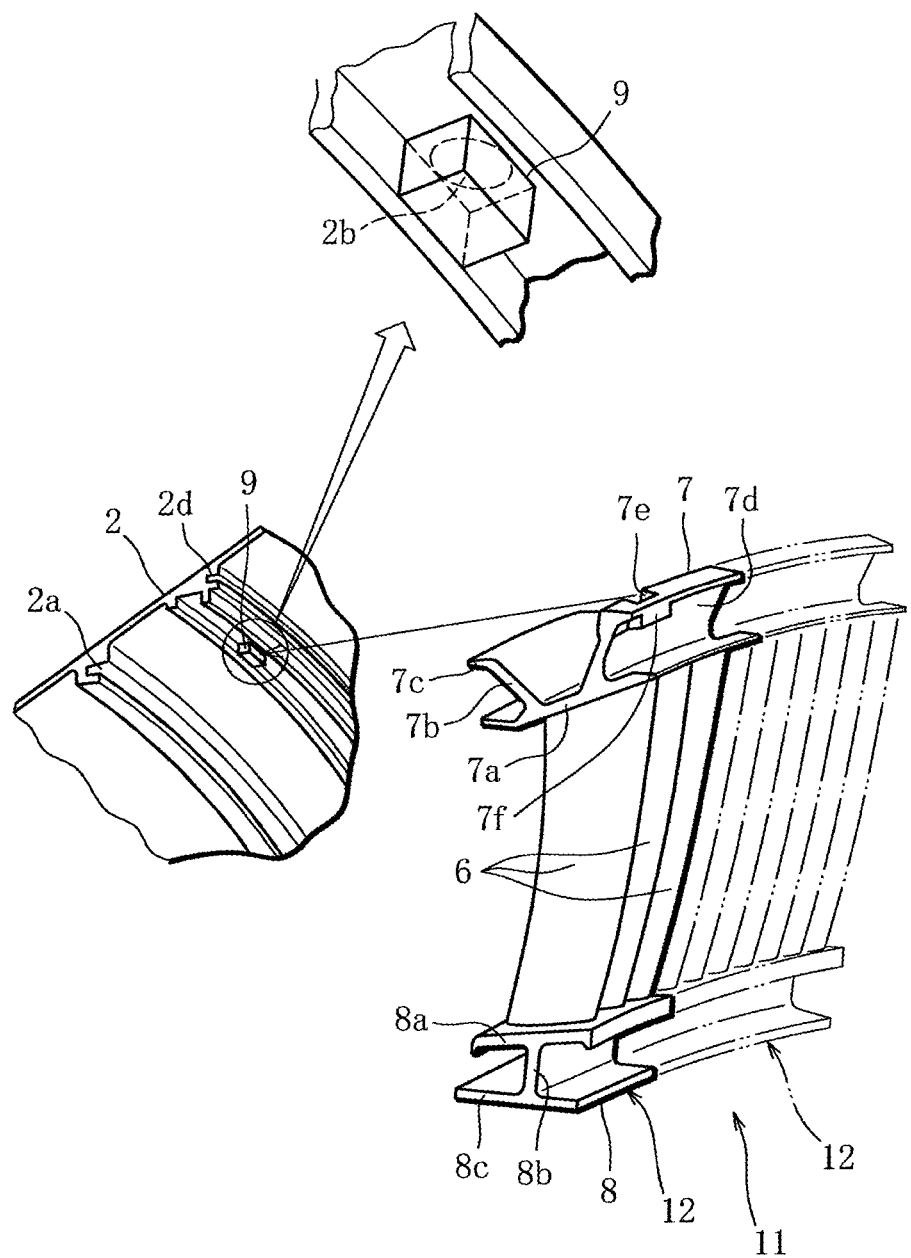
FIG. 2 is a perspective explanatory view illustrating a turbine nozzle segment of the turbine nozzle in the turbine in FIGS. 1A and 1B in detail together with a back side of a turbine case.

The turbine nozzle 11 includes a plurality of turbine nozzle segments 12, and the turbine nozzle segment 12 includes, as illustrated in FIG. 2, a plurality of stator vanes 6, an arc-shaped outer band 7 coupling distal ends of the plurality of stator vanes 6 on a side opposite to the engine axis to each other, respectively, and an arc-shaped inner band 8 coupling proximal ends of the plurality of stator vanes 6 on the engine axis side to each other, respectively.

Figure 1B:
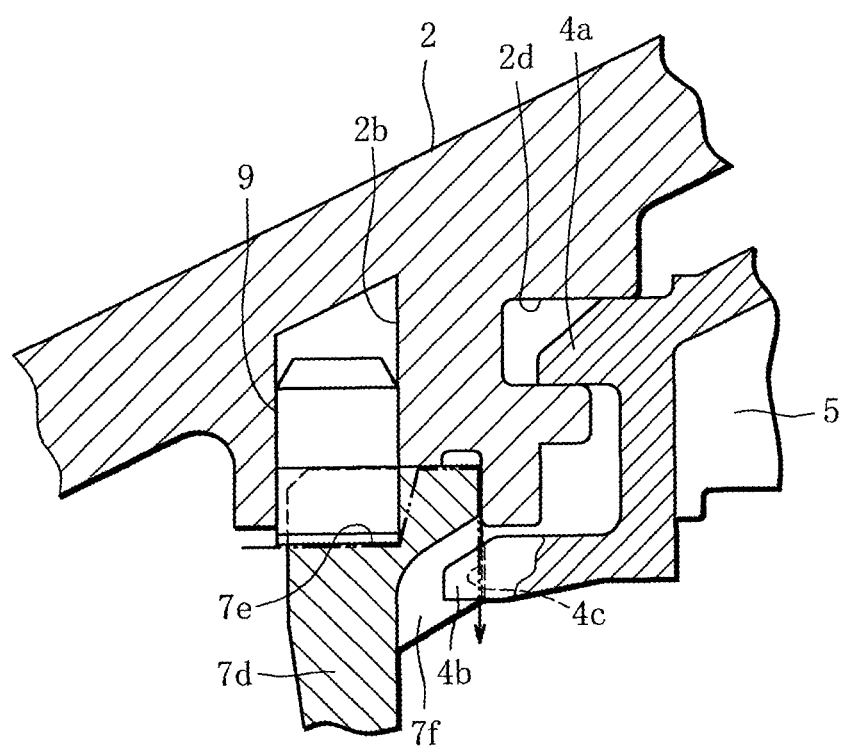
FIG. 1B is an enlarged explanatory view of a portion surrounded by a circle in FIG. 1A.
Figure 3:
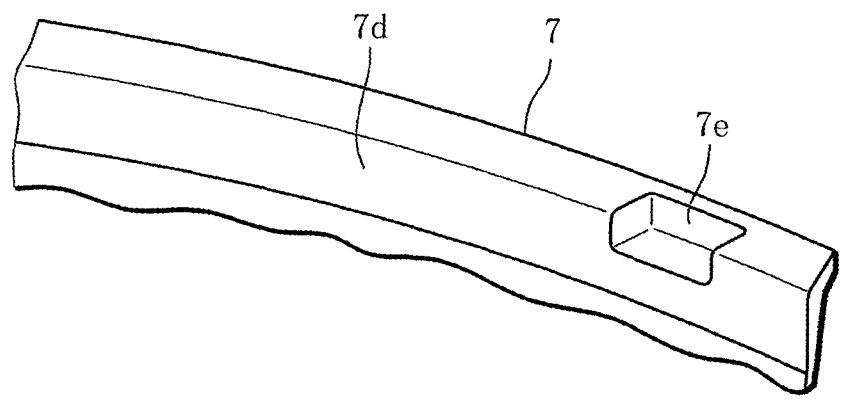
FIG. 3 is a partial perspective explanatory view illustrating a recessed portion formed on the turbine nozzle segment of the turbine nozzle in the turbine in FIGS. 1A and 1B in detail.

The outer band 7 in the turbine nozzle segment 12 includes a flowpath wall 7a, a front rim 7b extending in a centrifugal direction from this flowpath wall 7a and to a front (left direction in FIG. 1A), an arc-shaped hook 7c formed at a distal end of this front rim 7b and engaged with a nozzle support groove 2a formed in the turbine case 2, an arc-shaped rear rim 7d extending in the centrifugal direction from the flowpath wall 7a, a recessed portion 7e formed at a distal end of this rear rim 7d and fitted with an anti-rotation tab 9 secured to the turbine case 2 as illustrated also in FIGS. 1B and 3, and a protruding portion 7f protruding toward a rear of the jet engine (right direction in FIG. 1B), and the protruding portion 7f is formed in conformity to a recess of the recessed, portion 7e on a back side of the recessed portion 7e.

In this case, the anti-rotation tab 9 is secured by being fitted in a fitting hole 2b formed in the turbine case 2.

The hook 7c of the outer band 7 in this turbine nozzle segment 12 is engaged with the nozzle support groove 2a of the turbine case 2 from behind the jet engine (right direction in FIG. 1A), and the recessed portion 7e of the outer band 7 is fitted with the anti-rotation tab 9 from behind the jet engine.

Figure 4:
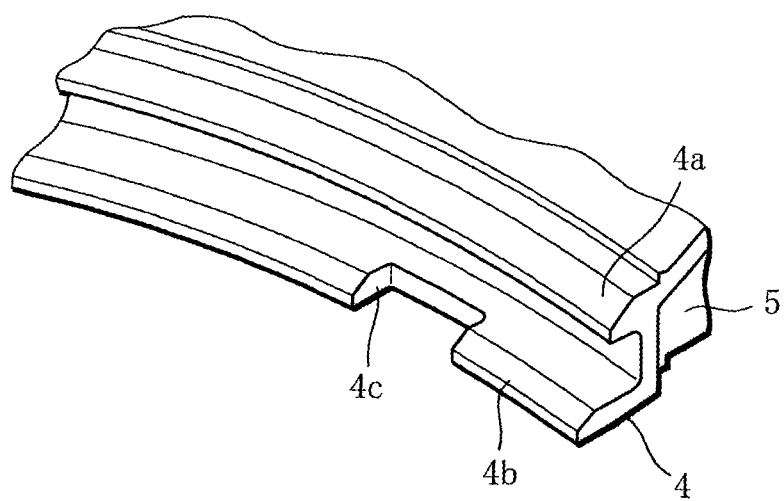
FIG. 4 is a partial perspective explanatory view illustrating an anti-rotation slot formed in a shroud in the turbine of the FIGS. 1A and 1B in detail.

With the protruding portion 7f formed on the back side of the recessed portion 7e, as illustrated also in FIG. 4, an anti-rotation slot 4c formed in a peripheral portion 4b of the shroud 4 is fitted from behind the jet engine, whereby the turbine nozzle segment 12 is secured between the turbine case 2 and the shroud 4 in a positioned state.

On the other hand, the inner band 8 in the turbine nozzle segment 12 includes a flowpath wall 8a, a rim 8b extending in a centripetal direction from this flowpath wall 8a, and a honeycomb seal support 8c formed at a distal end of this rim 8b, and on this honeycomb seal support 8c, a honeycomb seal 10 is arranged.

As described above, in the securing part structure of the turbine nozzle according to this embodiment, the hook 7c of the outer band 7 in the turbine nozzle segment 12 is engaged with the nozzle support groove 2a of the turbine case 2 from behind the jet engine (right direction in FIG. 1A), and the recessed portion 7e of the outer band 7 is fitted with the anti-rotation tab 9 from behind the jet engine as illustrated in FIG. 1B.

Then, by fitting the anti-rotation slot 4c of the peripheral portion 4b of the shroud 4 with the protruding portion 7f formed on the back side of the recessed portion 7e from behind the jet engine, the turbine nozzle segment 12 is secured between the turbine case 2 and the shroud 4 in the positioned state and thus, an amount of the high-temperature gas indicated by a virtual line in FIG. 1B, leaking from between the anti-rotation tab 9 on the turbine case 2 side and the turbine nozzle segment 12, can be kept small.

Therefore, in addition to the reduction of performance loss for the portion by which the amount of the leaking high-temperature gas can be kept small, the turbine case 2 is not exposed to high temperature easily any longer, whereby extension of the life of the turbine case 2 can be realized.

Moreover, since the rotation of the shroud 4 around the engine axis is also suppressed by fitting the anti-rotation slot 4c of the shroud 4 with the protruding portion 7f formed on the back side of the recessed portion 7e of the outer band 7, that is, since the protruding portion 7f formed in conformity to the recess of the recessed portion 7e on the back side of the recessed portion 7e of the outer band 7 also plays a role of an anti-rotation tab of the shroud 4, a rotation stopping portion to be fitted with the anti-rotation slot 4c of the shroud 4 does not have to be installed separately from the protruding portion 7f, and thus, the increase in the weight can be suppressed for that portion.

Moreover, as described above, since the turbine case 2 is not exposed to the high temperature easily any longer, if the low-pressure turbine 1 employs an active clearance control system, cooling air for cooling the turbine case 2 can be reduced.

Then, in the low-pressure turbine 1 according to this embodiment, improvement of performance and extension of the life can be realized.

The configurations of the securing part structure of the turbine nozzle and the turbine according to the present invention are not limited to the above-described embodiment.

EXPLANATION OF REFERENCE SIGNS 1 low-pressure turbine (turbine)
2 turbine case
2a nozzle support groove
4 shroud
4c anti-rotation slot
6 stator vane
7 outer band
7c hook
7e recessed portion
7f protruding portion.
9 anti-rotation tab
11 turbine nozzle
12 turbine nozzle segment

The invention claimed is:

1. A securing part structure of a turbine nozzle provided with a plurality of turbine nozzle segments, each having a plurality of stator vanes, arranged annularly around an axis of a jet engine and secured between a turbine case and a shroud of the jet engine, wherein
in the turbine nozzle segment, an arc-shaped outer band coupling each of distal ends of stator vanes on a side opposite to the axis to each other is provided;
on the outer band in the turbine nozzle segment, a hook engaged with a nozzle support groove formed on the turbine case, a recessed portion fitted with an anti-rotation tab secured to the turbine case, and a protruding portion protruding toward a rear of the jet engine, in conformity to a recess of the recessed portion, on a back side of this recessed portion, are formed; and
the turbine nozzle segment engages the hook of the outer band with the nozzle support groove of the turbine case from behind the jet engine and also fits the recessed portion of the outer band with the anti-rotation tab from behind the jet engine and fits an anti-rotation slot formed on the shroud with the protruding portion formed on the back side of the recessed portion from behind the jet engine, whereby the turbine nozzle segment is secured between the turbine case and the shroud.

2. A turbine in which the securing part structure of a turbine nozzle according to claim 1 is used for a securing part structure of the turbine nozzle constituting a turbine in a jet engine.

* * * * *